US012565872B1

(12) United States Patent
Chen

(10) Patent No.: US 12,565,872 B1

(45) Date of Patent: Mar. 3, 2026

(54) LOOPING WATER DEVICE

(71) Applicant: YU DING ENTERPRISE CO., LTD., Taichung (TW)

(72) Inventor: Chung-Min Chen, Taichung (TW)

(73) Assignee: YU DING ENTERPRISE CO., LTD, Taichung (TW)

( * ) Notice: Subject to any disclaimer, the term of this patent is extended or adjusted under 35 U.S.C. 154(b) by 0 days.

(21) Appl. No.: 18/890,696

(22) Filed: Sep. 19, 2024

(51) Int. Cl.
*F03B 13/06* (2006.01)
*F04F 3/00* (2006.01)

(52) U.S. Cl.
CPC ................ *F03B 13/06* (2013.01); *F04F 3/00* (2013.01)

(58) Field of Classification Search
None
See application file for complete search history.

(56) References Cited

U.S. PATENT DOCUMENTS 543,412 A * 7/1895 Taylor ....................... F04F 5/08 417/150
2,745,426 A * 5/1956 Ponsar ...................... E02B 7/18 137/143
2,887,956 A * 5/1959 Kunkel ..................... F04F 7/02 417/148

FOREIGN PATENT DOCUMENTS

CN 102072075 A 5/2011
CN 105484936 A 4/2016
CN 106286102 A 1/2017
CN 115405456 A 11/2022
FR 2462585 A1 * 2/1981 ............ F03B 17/005

OTHER PUBLICATIONS

FR 2462585 A1 machine translation to English from espacenet (Year: 2025).*

* cited by examiner

*Primary Examiner* — Michael Quandt
(74) *Attorney, Agent, or Firm* — Apex Juris, pllc; Cera Oh

(57) ABSTRACT

A looping water device has a container, a barrel body, an inlet pipe, and a switch valve. The container has a major tank and a vacuum tube. A water surface in the major tank approaches a datum plane. The vacuum tube is full of water. The barrel body contains air, is secured inside the major tank, and has a discharge port. The inlet pipe is connected to the barrel body and extends into the vacuum tube. The switch valve is connected between the inlet pipe and the barrel body. The air in the barrel body is compressed by water entering into the barrel body from the inlet pipe. When air pressure exceeds, the water in the barrel body is pushed into the major tank. A differential height between the water surfaces of the vacuum tube and the major tank is kept by the atmospheric pressure.

12 Claims, 2 Drawing Sheets

LOOPING WATER DEVICE

BACKGROUND OF THE INVENTION

1. Field of the Invention

The present invention relates to a device that is configured to facilitate water inside the device to flow.

2. Description of Related Art

Fluid, including gas and liquids, may flow from a high pressure to a low pressure in a system. When the pressure in the system is balanced, the fluid stops flowing and becomes stationary.

Fluids include compressible fluids and incompressible fluids. When a compressible fluid, e.g. gas, is under pressure, its volume will be decreased and its density will be increased. When an incompressible fluid, e.g. water, is under pressure, its volume and density will remain unchanged.

Therefore, utilizing the properties of compressible fluids and incompressible fluids to facilitate the incompressible fluids tending to flow is an important research topic.

SUMMARY OF THE INVENTION

The main objective of the present invention is to provide a looping water device, that is configured to facilitate water inside the device to flow via atmospheric pressure outside the device, compressible fluids, and pressure differences inside the device.

The looping water device comprises a container, a barrel body, an inlet pipe, and a switch valve. The container comprises a major tank and a vacuum tube. The major tank contains water and has a tank opening at a top of the major tank, a datum plane, and a tank bottom located below the datum plane. A differential height between the datum plane and the tank bottom is greater than or equal to 10 meters. A water surface in the major tank approaches the datum plane. The vacuum tube is combined with the major tank, partially extends into the major tank, extends upwardly and out of the tank opening of the major tank, and is full of water. The vacuum tube has a lower opening disposed at a bottom of the vacuum tube and fluidly communicating with the major tank and an upper cap closing a top of the vacuum tube. A differential height between a bottom surface of the upper cap and the datum plane is greater than or equal to 10 meters. The barrel body is hollow, is secured inside the major tank, and contains air. The barrel body has a discharge port disposed at a bottom of the barrel body and fluidly communicating with the major tank. A water surface is located inside the barrel body and below the air inside the barrel body. The inlet pipe is connected to a peripheral wall of the barrel body, extends into the vacuum tube, and is filled with water. The inlet pipe has an inlet port disposed in and fluidly communicating with the vacuum tube and facing toward the upper cap and has an outlet port connected to the peripheral wall of the barrel body, fluidly communicating with the barrel body, and located higher than the water surface in the barrel body. A length of the inlet pipe is larger than 20 meters. A differential height between the inlet port and the outlet port of the inlet pipe is larger than 15 meters. The switch valve is connected between the inlet pipe and the barrel body and is configured to open or close a passage between the inlet pipe and the barrel body.

Since the differential height between the inlet port and the outlet port of the inlet pipe is over 15 meters, and the outlet port is fluidly connected to the barrel body and is located above the water surface inside the barrel body, when the switch valve is opened, the water inside the inlet pipe is affected by gravity and tends to flow downwardly. Pressure at the outlet port of the inlet pipe is affected by a weight of the water inside the inlet pipe and the water pressure inside the inlet pipe, and is slightly larger than the air pressure inside the barrel body, thereby facilitating the water inside the inlet pipe to flow into the barrel body. Since specific weight of water is larger than specific weight of air, after flowing into the barrel body, the water inside the inlet pipe tends to flow downwardly and the air inside the barrel body is compressed. The water at the top of the vacuum tube may flow into the inlet pipe via the inlet port thereof. The atmospheric pressure applied to the water surface in the major tank will keep the differential height between the water surfaces in the vacuum tube and in the major tank at 10 meters. When the pressure of the air inside the barrel body is larger than the pressure at the water surface in the barrel body, the water inside the barrel body may be pressed out of the barrel body by the air pressure, and the water inside the inlet pipe is capable of flowing into the barrel body. Whereby, the water cyclically flows in the looping water device.

Other objects, advantages, and novel features of the invention will become more apparent from the following detailed description when taken in conjunction with the accompanying drawings.

DETAILED DESCRIPTION OF PREFERRED EMBODIMENTS

Figure 1:
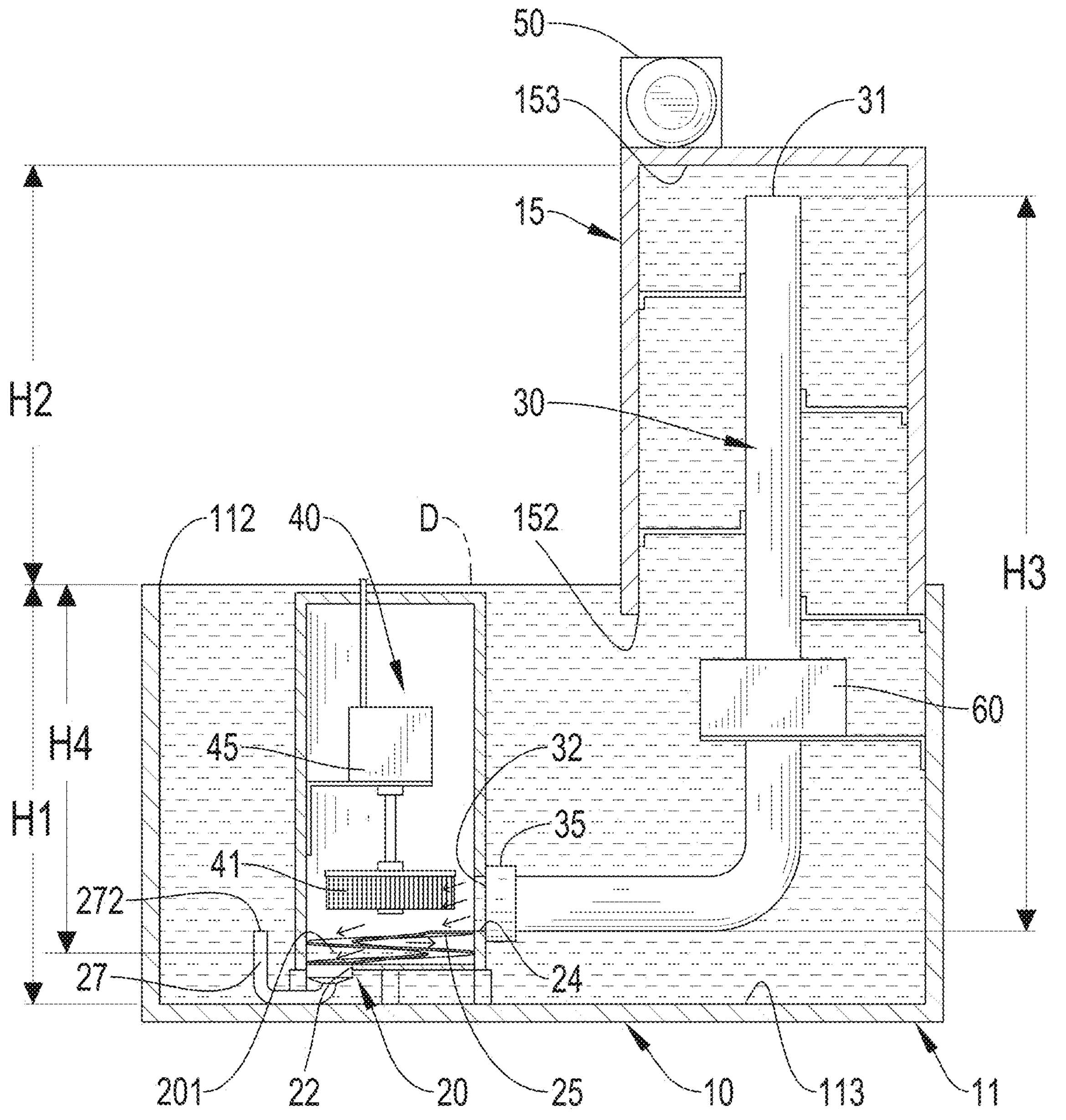
FIG. 1 is a schematic view in section of a first embodiment of a looping water device in accordance with the present invention.

With reference to FIG. 1, a first embodiment of a looping water device in accordance with the present invention comprises a container 10, a barrel body 20, an inlet pipe 30, a switch valve 35, and a pump 60.

The container 10 includes a major tank 11 and a vacuum tube 15. The major tank 11 has a tank opening 112, a datum plane D, and a tank bottom 113.

The tank opening 112 is disposed at a top of the container 10 and fluidly communicate between the major tank 11 and outside of the device of the present invention. A position of the datum plane D is not higher than the tank opening 112. The tank bottom 113 is located below the datum plane D. A differential height H1 between the tank bottom 113 and the datum plane D is greater than or equal to 10 meters.

The vacuum tube 15 is combined with the major tank 11, partially extends into the major tank 11, and extends upwardly and out of the tank opening 112 of the major tank 11. The vacuum tube 15 has a lower opening 152 and an upper cap 153. The lower opening 152 is disposed at a bottom of the vacuum tube 15 and fluidly communicates with the major tank 11. The upper cap 153 closes a top of the vacuum tube 15. A differential height H2 between a bottom surface of the upper cap 153 and the datum plane D is greater than or equal to 10 meters. The major tank 11 contains water. A water surface inside the major tank 11 approaches the datum plane D. The vacuum tube 15 is full of water without air inside the vacuum tube 15.

Specifically, an aspirator 50 is connected to and fluidly communicates with the vacuum tube 15 and is configured to remove air inside the vacuum tube 15 by sucking. After removing air inside the vacuum tube 15, because the water surface of the water inside the major tank 11 is subjected to an external atmospheric pressure, the water inside the major tank 11 is pressed into the vacuum tube 15. Since one atmospheric pressure (1 atm) can support a column of water up to 10 meters in height, a differential height between a water surface in the vacuum tube 15 and the water surface in the major tank 11 is around 10 meters. Therefore, when the water surface in the major tank 11 arrives at the datum plane D, the differential height between the water surfaces in the vacuum tube 15 and the major tank 11 is around 10 meters. Since the differential height between the tank bottom 113 of the major tank 11 and the datum plane D is around 10 meters, a water pressure applied to the tank bottom 113 is around 1 atmospheric pressure (1 atm).

The barrel body 20 is hollow and is secured inside the major tank 11. The barrel body 20 may be under the datum plane D. The barrel body 20 has a discharge port 22 disposed at a bottom thereof and fluidly communicating with the major tank 11. The barrel body 20 may be cylindrical and contains air. Before the barrel body 20 is placed into the major tank 11, an air pressure of the air inside the barrel body 20 is same as the air pressure outside the device of the present invention and is one atmospheric pressure (1 atm). When the barrel body 20 is placed into the major tank 11, the water in the major tank 11 may enter into the barrel body 20 via the discharge port 22 to form a water surface 201 located in the barrel body 20 and below the air contained in the barrel body 20. As a result, the air pressure inside the barrel body 20 is equal to a pressure on the water surface 201 in the barrel body 20.

The inlet pipe 30 is connected to a peripheral wall of the barrel body 20, extends into the vacuum tube 15, and is filled with water. The inlet pipe 30 has an inlet port 31 and an outlet port 32. The inlet port 31 is disposed in and fluidly communicates with the vacuum tube 15 and faces toward the upper cap 153 of the vacuum tube 15. The inlet port 31 is slightly lower than the water surface in the vacuum tube 15. The outlet port 32 is connected to the peripheral wall of the barrel body 20 and fluidly communicates with the barrel body 20. The outlet port 32 is located higher than the water surface 201 in the barrel body 20. A length of the inlet pipe 30 is larger than and equal to 20 meters. A differential height H3 between the inlet port 31 and the outlet port 32 is larger than 15 meters. A preferred differential height H3 between the inlet port 31 and the outlet port 32 is larger than 18 meters.

The switch valve 35 is connected between the inlet pipe 30 and the barrel body 20 and is configured to open or close a passage between the inlet pipe 30 and the barrel body 20.

The pump 60 is connected to and fluidly communicates with the inlet pipe 30 and is configured to drive the water inside the inlet pipe 30 flowing toward the outlet port 32 of the inlet pipe 30.

When the switch valve 35 is opened, the water inside the inlet pipe 30 tends to flow downwardly by gravity. Since the differential height H3 between the inlet port 31 and the outlet port 32 of the inlet pipe 30 is larger than 15 meters, the water inside the inlet pipe 30 can flow into the barrel body 20 with an assistance of the pump 60 when a pressure on the outlet port 32 of the inlet pipe 30 is larger than the air pressure inside the barrel body 20. As a result, a volume of the air inside the barrel body 20 is decreased, the air is compressed, and the air pressure inside the barrel body 20 is increased. Since the specific weight of the water is larger than the specific weight of the air, after flowing into the barrel body 20, the water tends to flow downwardly to raise the water surface in the barrel body 20. The water at a top of the vacuum tube 15 can flow into the inlet pipe 30 via the inlet port 31 thereof. When the differential height between the water surfaces inside the vacuum tube 15 and the major tank 11 is decreased, the atmospheric pressure outside the device of the present invention applied to the water surface inside the major tank 11 will press the water in the major tank 11 into the vacuum tube 15 to keep the differential height between the water surfaces in the vacuum tube 15 and the major tank 11 at around 10 meters.

When water continuously enters the barrel body 20 to raise the water surface 201 in the barrel body 20, the air pressure inside the barrel body 20 is increased. Because the water surface 201 in the barrel body 20 raises, a differential height H4 between the water surface 201 in the barrel body 20 and the water surface in the major tank 11 is decreased. As a result, the pressure on the water surface 201 in the barrel body 20 is decreased. When the air pressure in the barrel body 20 is larger than the pressure on the water surface 201 in the barrel body 20, the water inside the barrel body 20 is pressed down to enter into the major tank 11 via the discharge port 22 by the air pressure inside the barrel body 20. As a result, the air pressure inside the barrel body 20 is decreased. When the air pressure inside the barrel body 20 is smaller than the pressure at the outlet port 32 of the inlet pipe 30, the water inside the inlet pipe 30 continuously enters into the barrel body 20, such that the water is pressed to cyclically flow in the device of the present invention. Accordingly, the pump 60 only needs to provide a pressure just enough to press the water inside the inlet pipe 30 to enter into the barrel body 20 to facilitate the water in the container 10 to flow cyclically.

Further to this, the device of the present invention may have a power generating unit 40. The power generating unit 40 comprises a water turbine 41 disposed in the barrel body 20 and a power generator 45 connected to the water turbine 41. The water turbine 41 is adjacent to the outlet port 32 of the inlet pipe 30. The power generator 45 is secured inside the barrel body 20 and is located above the water turbine 41. When the water inside the inlet pipe 30 enters into the barrel body 20 via the outlet port 32 of the inlet pipe 30, the water turbine 41 is impacted by the water entering into the barrel body 20 from the inlet pipe 30 to spin and to drive the power generator 45 for power generation.

Moreover, the barrel body 20 has an incoming port 24 formed in the peripheral wall thereof. The outlet port 32 of the inlet pipe 30 is connected with and fluidly communicates with the incoming port 24. A chute 25 is disposed in the barrel body 20, is located below the outlet port 32 of the inlet pipe 30, extends downwardly and spirally around an internal peripheral surface of the barrel body 20. After the water entering into the barrel body 20 via the outlet port 32 of the inlet pipe 30, the water may flow downwardly along the chute 25.

Furthermore, the bottom of the barrel body 20 is partially closed to form the discharge port 22 disposed at the bottom of the barrel body 20 to fluidly communicate with the major tank 11. A discharge pipe 27 is connected to the discharge port 22, is U-shaped, extends into the major tank 11, and fluidly communicates between the barrel body 20 and the major tank 11. An inlet port of the discharge pipe 27 is connected to and fluidly communicates with the discharge port 22 and is located at a bottom end of the chute 25. An outlet port 272 of the discharge pipe 27 is disposed in the major tank 11 and is located slightly higher than the water surface 201 in the barrel body 20. The water flowing downwardly along the chute 25 is discharged to the major tank 11 via the discharge pipe 27. Since the outlet port 272 of the discharge pipe 27 is higher than the water surface 201 in the barrel body 20, wherein the outlet port 272 of the discharge pipe 27 may be around 2 meters higher than the water surface 201 in the barrel body 20, a water pressure at the outlet port 272 of the discharge pipe 27 is smaller than the water pressure on the water surface 201 in the barrel body 20. As a result, the water inside the barrel body 20 tends to flow toward the outlet port 272 of the discharge pipe 27.

Figure 2:
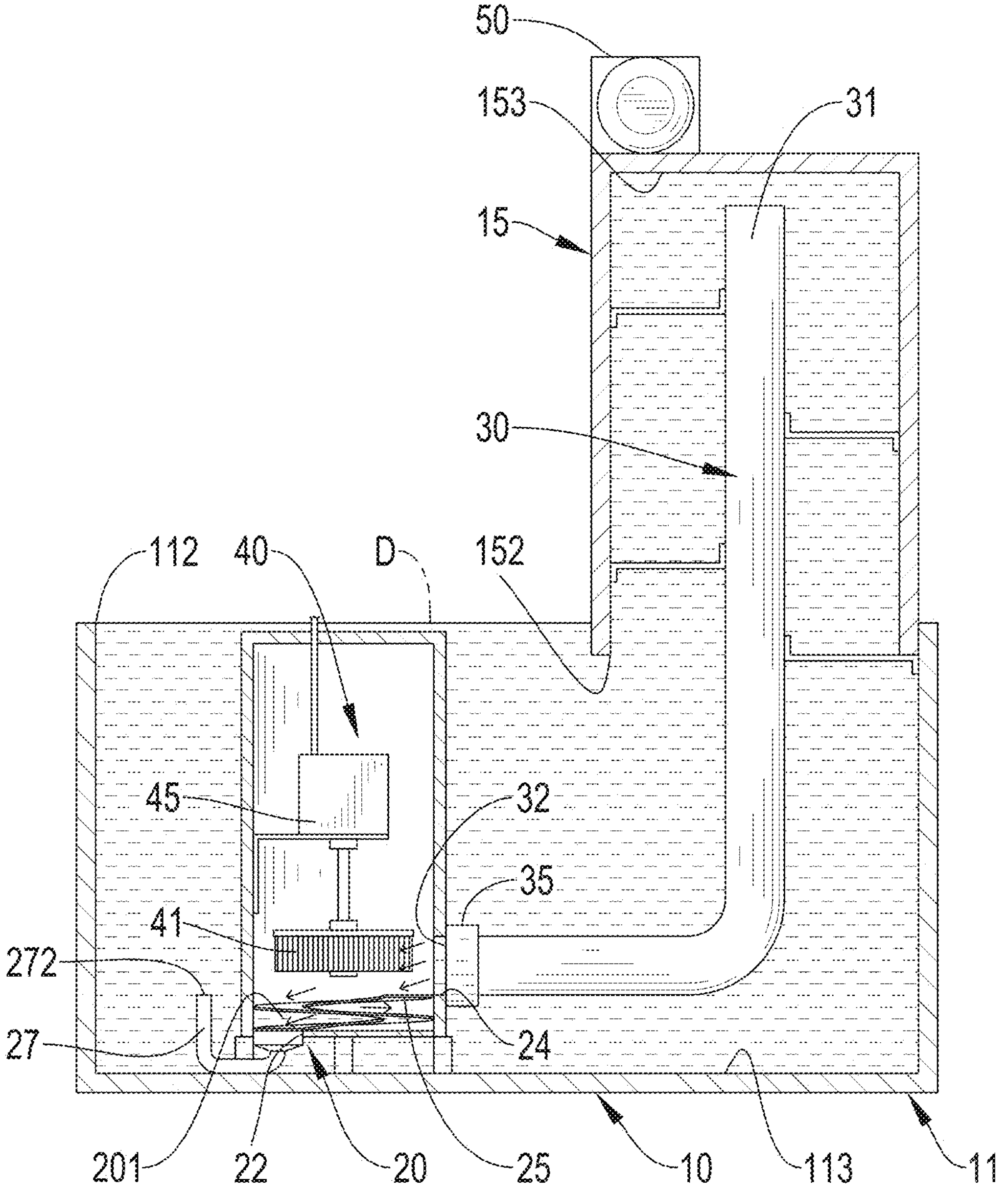
FIG. 2 is a schematic view in section of a second embodiment of a looping water device in accordance with the present invention.

With reference to FIG. 2, in a second embodiment of a looping water device in accordance with the present invention, the pump connected to the inlet pipe 30 is omitted. The differential height H3 between the inlet port 31 and the outlet port 32 of the inlet pipe 30 is larger than 15 meters. The outlet port 32 is connected to the barrel body 20 and is located higher than the water surface 201 in the barrel body 20. Wherein, the water surface in the major tank 11 is a boundary. The water, inside the major tank 11 and under the water surface in the major tank 11, is affected by gravity to press down. As a result, the deeper the position under the water surface in the major tank 11, the greater the water pressure. Pressing forces under the water surface inside the major tank 11 transfer outward. On the other hand, the water pressure inside the vacuum tube 15 above the water surface in the major tank 11 is in an opposite way. The more adjacent to the water surface inside the major tank 11, the lower the pressure is. As a result, inside the vacuum tube 15, the more distant from the water surface inside the major tank 11, the larger the pressure is. The water in the vacuum tube 15 is pressed inward. It can be known that, a position inside the vacuum tube 15 around the inlet port 31 of the inlet pipe 30 has the highest pressure. Because the inlet pipe 30 is filled with water and the differential height between the inlet port 31 and the outlet port 32 of the inlet pipe 30 is larger than 15 meters, water pressure at the outlet port 32 is larger than 1.5 atmospheric pressure (1.5 atm). Further to this, the water inside the inlet pipe 30 is affected by gravity and tends to flow downward. That is, the pressure at the outlet port 32 of the inlet pipe 30 is affected by a weight of the water inside the inlet pipe 30 and affected by the differential height between the inlet port 31 and the outlet port 32 of the inlet pipe 30, it is slightly larger than the air pressure in the barrel body 20. When the switch valve 35 is switched to open, the water inside the inlet pipe 30 may tend to flow into the barrel body 20 to compress the air inside the barrel body 20, thereby causing the air pressure inside the barrel body 20 to become larger than the water pressure inside the barrel body 20. Hence, the water in the barrel body 20 is pressed out to the major tank 11 to decrease the air pressure in the barrel body 20. While the air pressure in the barrel body 20 is smaller than the pressure at the outlet port 32 of the inlet pipe 30, the water inside the inlet pipe 30 tends to enter into the barrel body 20 again. While the water inside the inlet pipe 30 is flowing down, the water at the top of the vacuum tube 15 may enter into the inlet pipe 30 via the inlet port 31 thereof. When the differential height between the water surfaces in the vacuum tube 15 and the major tank 11 is decreased to less than 10 meters, the atmospheric pressure outside the present invention is applied to the water surface in the major tank 11 and presses the water in the major tank 11 into the vacuum tube 15 to keep the differential height between the water surfaces inside the vacuum tube 15 and the major tank 11 remaining around 10 meters. Whereby, the water inside the vacuum tube 15 may continuously enter into the inlet pipe 30.

With foregoing subject matters, the differential height between the water surfaces in the vacuum tube 15 and the major tank 11 can be kept by the atmospheric pressure applied to the water surface in the major tank 11. The water inside the inlet pipe 30 is affected by the differential height between the inlet port 31 and the outlet port 32 of the inlet pipe 30 and a pressure generated by the weight of the water in the inlet pipe 30, whereby the water inside the inlet pipe 30 tends to flow down by gravity to enter into the barrel body 20 and to compress the air inside the barrel body 20. When the air pressure in the barrel body 20 is larger than the water pressure in the barrel body 20, the water inside the barrel body 20 is pushed into the major tank 11 by the air pressure inside the barrel body 20. Accordingly, the water is promoted to cyclically flow in the looping water device.

What is claimed is:

1. A looping water device comprising:

a container comprising:

a major tank containing water and having a tank opening formed in a top of the major tank;

a datum plane;

a tank bottom located below the datum plane;

a differential height between the datum plane and the tank bottom being greater than or equal to 10 meters; and a water surface in the major tank approaching the datum plane; and a vacuum tube combined with the major tank, partially extending into the major tank, extending upwardly and out of the tank opening of the major tank, and being full of water, the vacuum tube having a lower opening located at a bottom of the vacuum tube and fluidly communicating with the major tank;

an upper cap closing a top of the vacuum tube; and a differential height between a bottom surface of the upper cap and the datum plane being greater than or equal to 10 meters;

a barrel body being hollow, secured inside the major tank, containing air, and having a discharge port disposed at a bottom of the barrel body and fluidly communicating with the major tank; and a water surface inside the barrel body and located below the air inside the barrel body;

an inlet pipe connected to a peripheral wall of the barrel body, extending into the vacuum tube, and being filled with water, the inlet pipe having an inlet port disposed in and fluidly communicating with the vacuum tube and facing toward the upper cap;

an outlet port connected to the peripheral wall of the barrel body, fluidly communicating with the barrel body, and located higher than the water surface in the barrel body;

a length being larger than 20 meters; and a differential height between the inlet port and the outlet port of the inlet pipe being larger than 15 meters; and a switch valve connected between the inlet pipe and the barrel body and configured to open or close a passage between the inlet pipe and the barrel body.

2. The looping water device as claimed in claim 1, comprising an aspirator fluidly communicating with the vacuum tube and configured to remove air inside the vacuum tube by sucking.

3. The looping water device as claimed in claim 2, comprising a pump fluidly communicating with the inlet pipe and configured to drive the water inside the inlet pipe flowing toward the outlet port of the inlet pipe.

4. The looping water device as claimed in claim 3, comprising a power generating unit;
- wherein the power generating unit comprises a water turbine disposed in the barrel body; and
- the water turbine is impacted to spin by the water flowing into the barrel body from the inlet pipe.

5. The looping water device as claimed in claim 4, wherein
- the barrel body has an incoming port formed in the peripheral wall of the barrel body;
- the outlet port of the inlet pipe is connected to the incoming port of the barrel body; and
- a chute is disposed in the barrel body, is located below the outlet port of the inlet pipe, and extends downwardly and spirally around an internal peripheral surface of the barrel body.

6. The looping water device as claimed in claim 5, wherein
- the bottom of the barrel body is partially closed to form the discharge port disposed at the bottom of the barrel body;
- a discharge pipe is connected to the discharge port, is U-shaped, and extends into the major tank;
- an inlet port of the discharge pipe is connected to the discharge port of the barrel body; and
- an outlet port of the discharge pipe is disposed in the major tank and is located higher than the water surface in the barrel body.

7. The looping water device as claimed in claim 2, comprising a power generating unit;
- wherein the power generating unit comprises a water turbine disposed in the barrel body; and
- the water turbine is impacted to spin by the water flowing into the barrel body from the inlet pipe.

8. The looping water device as claimed in claim 5, wherein
- the barrel body has an incoming port formed in the peripheral wall of the barrel body;
- the outlet port of the inlet pipe is connected to the incoming port of the barrel body; and
- a chute is disposed in the barrel body, is located below the outlet port of the inlet pipe, and extends downwardly and spirally around an internal peripheral surface of the barrel body.

9. The looping water device as claimed in claim 8, wherein
- the bottom of the barrel body is partially closed to form the discharge port disposed at the bottom of the barrel body;
- a discharge pipe is connected to the discharge port, is U-shaped, and extends into the major tank;
- an inlet port of the discharge pipe is connected to the discharge port of the barrel body; and
- an outlet port of the discharge pipe is disposed in the major tank and is located higher than the water surface in the barrel body.

10. The looping water device as claimed in claim 1, comprising a power generating unit;
- wherein the power generating unit comprises a water turbine disposed in the barrel body; and
- the water turbine is impacted to spin by the water flowing into the barrel body from the inlet pipe.

11. The looping water device as claimed in claim 10, wherein
- the barrel body has an incoming port formed in the peripheral wall of the barrel body;
- the outlet port of the inlet pipe is connected to the incoming port of the barrel body; and
- a chute is disposed in the barrel body, is located below the outlet port of the inlet pipe, and extends downwardly and spirally around an internal peripheral surface of the barrel body.

12. The looping water device as claimed in claim 11, wherein
- the bottom of the barrel body is partially closed to form the discharge port disposed at the bottom of the barrel body;
- a discharge pipe is connected to the discharge port, is U-shaped, and extends into the major tank;
- an inlet port of the discharge pipe is connected to the discharge port of the barrel body; and
- an outlet port of the discharge pipe is disposed in the major tank and is located higher than the water surface in the barrel body.

* * * * *